US011493138B2

(12) United States Patent
Chiu et al.

(10) Patent No.: US 11,493,138 B2
(45) Date of Patent: Nov. 8, 2022

(54) BALL VALVE STRUCTURE

(71) Applicant: ASIAN FIRST REFRIGERATION CORPORATION, Taichung (TW)

(72) Inventors: Sheng Chih Chiu, Taichung (TW); Zong-Cheng Jiang, Taichung (TW)

(73) Assignee: Asian First Refrigeration Corporation, Taichung (TW)

( * ) Notice: Subject to any disclaimer, the term of this patent is extended or adjusted under 35 U.S.C. 154(b) by 0 days.

(21) Appl. No.: 17/036,290

(22) Filed: Sep. 29, 2020

(65) Prior Publication Data

US 2021/0254727 A1 Aug. 19, 2021

(30) Foreign Application Priority Data

Feb. 18, 2020 (TW) .................................. 109201759

(51) Int. Cl.
*F16K 5/06* (2006.01)
*F16K 5/20* (2006.01)

(52) U.S. Cl.
CPC .......... *F16K 5/0689* (2013.01); *F16K 5/0626* (2013.01); *F16K 5/0647* (2013.01); *F16K 5/201* (2013.01)

(58) Field of Classification Search
CPC .... F16K 5/0626; F16K 5/0642; F16K 5/0668; F16K 5/0689; F16K 5/0647; F16K 5/201; F16K 27/067
See application file for complete search history.

(56) References Cited

U.S. PATENT DOCUMENTS

| 3,181,834 | A | * | 5/1965 | Etcheverryjohnp | F16K 5/0647 251/172 |
| 3,985,334 | A | * | 10/1976 | Domyan | F16K 5/0642 251/315.11 |
| 4,479,513 | A | * | 10/1984 | Koch | F16K 27/067 251/286 |
| 4,844,410 | A | * | 7/1989 | Eminger | F16K 5/0673 251/159 |
| 6,378,841 | B1 | * | 4/2002 | Russell | F16K 31/535 251/192 |
| 2003/0111631 | A1 | | 6/2003 | Gosling | |
| 2005/0258386 | A1 | * | 11/2005 | Wang | F16K 5/20 251/174 |
| 2007/0027432 | A1 | * | 2/2007 | Radford | F16K 5/0668 604/317 |

(Continued)

FOREIGN PATENT DOCUMENTS

| DE | 2807913 A1 * | 8/1979 | ............ F16K 5/201 |
| GB | 1475647 A * | 6/1977 | ............ F16K 5/201 |
| GB | 1572389 A * | 7/1980 | ........... F16K 5/0673 |

*Primary Examiner* — Hailey K. Do
(74) *Attorney, Agent, or Firm* — Rosenberg, Klein & Lee

(57) ABSTRACT

A ball valve structure includes a valve body having a valve chamber therein. A valve ball is accommodated in the valve chamber. The valve ball defines a flow hole therein. Two gaskets are in close contact with two opposite side surfaces of the valve ball, so that the valve ball can rotate around a fixed point in the valve chamber. One side of one of the two gaskets abuts against a washer and a compression spring, so that the gasket is elastically pressed against a surface of the valve ball. A valve stem is connected to the valve ball through the valve body for driving the valve ball to rotate, enabling the flow hole to be opened.

5 Claims, 5 Drawing Sheets

(56) References Cited

U.S. PATENT DOCUMENTS

| | | | | |
|---|---|---|---|---|
| 2008/0283699 A1* | 11/2008 | Jou | ............... | F16K 27/067 248/176.1 |
| 2010/0276624 A1* | 11/2010 | Holpuch | ............... | F16K 27/067 251/357 |
| 2011/0260088 A1* | 10/2011 | Cunningham | ............... | F16K 5/0642 251/315.01 |
| 2019/0162315 A1* | 5/2019 | Matsumura | ............... | F16K 5/0642 |
| 2019/0249786 A1* | 8/2019 | Bell | ............... | F16K 5/0626 |
| 2020/0370662 A1* | 11/2020 | Ray | ............... | F16K 5/205 |

* cited by examiner

US 11,493,138 B2

BALL VALVE STRUCTURE

FIELD OF THE INVENTION

The present invention relates to a valve structure, and more particularly to a ball valve structure.

BACKGROUND OF THE INVENTION

A conventional ball valve switch used for transmitting a high-pressure fluid is provided with two gaskets on two opposite side surfaces of a valve ball to prevent leakage because of extreme pressure during the transmission. The two gaskets are in close contact with the surface of the valve ball to prevent leakage, and the valve ball can be rotated around a fixed point.

In general, the gaskets used for clamping the two opposite sides of the valve ball are made of a hard material, such as Teflon. In use, when the valve ball rotates, the gaskets will be worn to cause a gap between the valve ball and each gasket to fail the leakproof effect. Furthermore, the conventional ball valve switch provides a tightening bolt to abut against the gasket, so that the gasket is in close contact with the surface of the valve ball. However, when assembling, if the tightening bolt is locked excessively, the gasket will be over-fitted with the valve ball. As a result, the valve ball cannot rotate smoothly. That is to say, the locking position of the tightening bolt will directly affect the tightness of the ball valve switch to be switched. Therefore, in order to provide an appropriate tightness of the ball valve switch, the tightening bolt needs to be repeatedly rotated and locked to adjust the optimal locking position in the assembly process. As a result, the conventional ball valve switch generally has the disadvantages of time-consuming and troublesome assembly.

US Patent Early Publication No. US2003/0111631 discloses a leakproof ball valve structure. The gaskets on both sides of the valve ball are pressed by elastic members each in the form of a buckle ring, so that the two gaskets are in close contact with both side surfaces of the valve ball. However, this configuration will make the two gaskets in a displaceable and unstable state. Therefore, when the user rotates and switches the position of the valve ball, the uneven forces on both sides or the insufficient pressing force of the elastic member is likely to cause excessive deflection and shaking of the two gaskets and pressure leakage.

SUMMARY OF THE INVENTION

The primary object of the present invention is to provide a ball valve structure, which provides a leakproof effect in a high-pressure operating environment, and can effectively prolong its service life, and is simple and fast in assembly.

In order to achieve the above object, the present invention provides a ball valve structure, comprising:
a valve body, having a valve chamber therein;
a valve ball, accommodated in the valve chamber, the valve ball defining a flow hole therein, a first gasket and a second gasket being in close contact with two opposite side surfaces of the valve ball so that the valve ball can rotate around a fixed point in the valve chamber, one side of the first gasket, facing away from the valve ball, abutting against a washer and a compression spring, the compression spring being held against the washer so that the first gasket is elastically pressed against a surface of the valve ball;
a valve stem, connected to the valve ball through the valve body, for driving the valve ball to rotate, enabling the flow hole to be opened.

DETAILED DESCRIPTION OF THE PREFERRED EMBODIMENTS

Embodiments of the present invention will now be described, by way of example only, with reference to the accompanying drawings.

Figure 1:
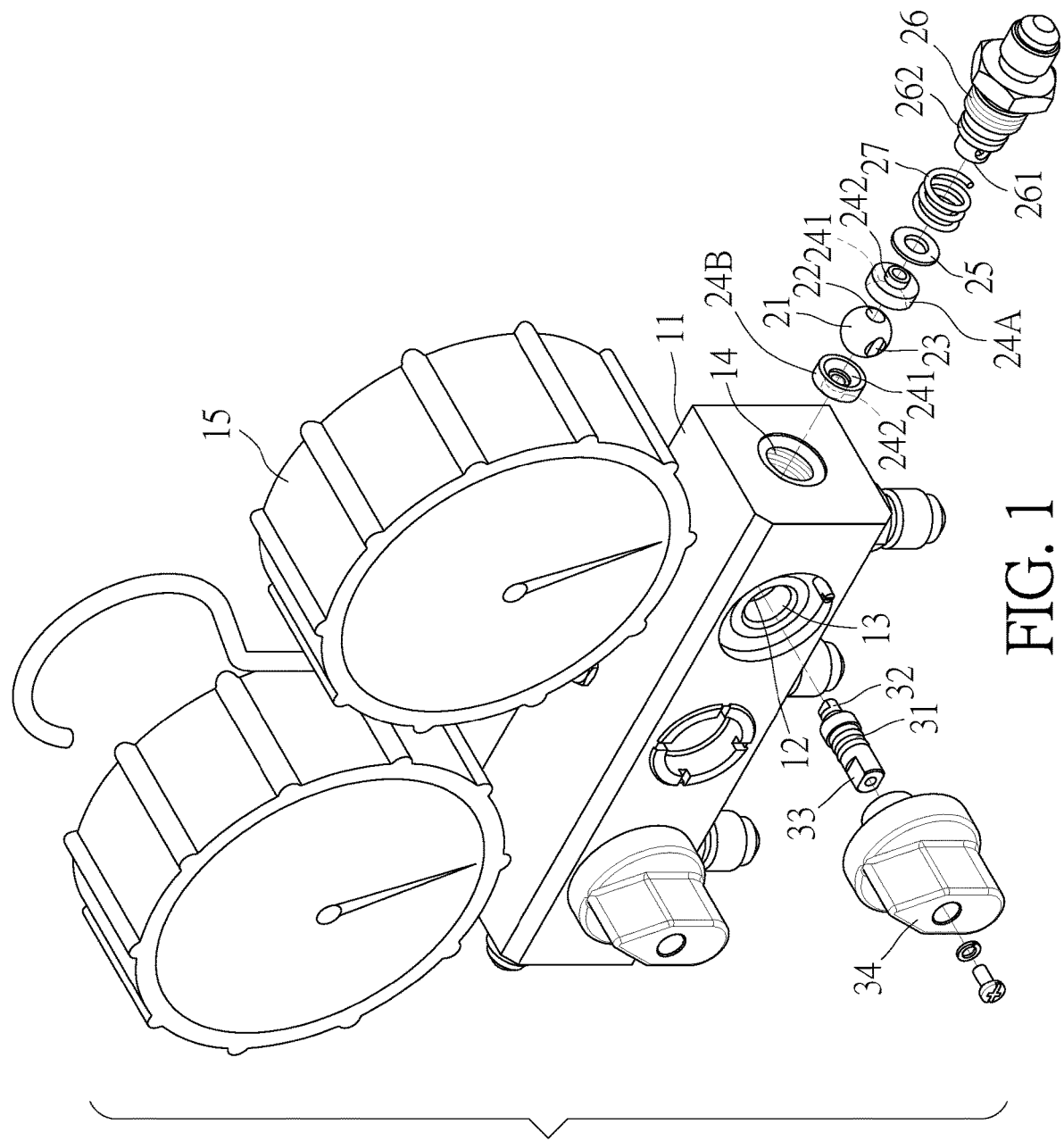
FIG. 1 is an exploded view according to a first embodiment of the present invention.
Figure 2:
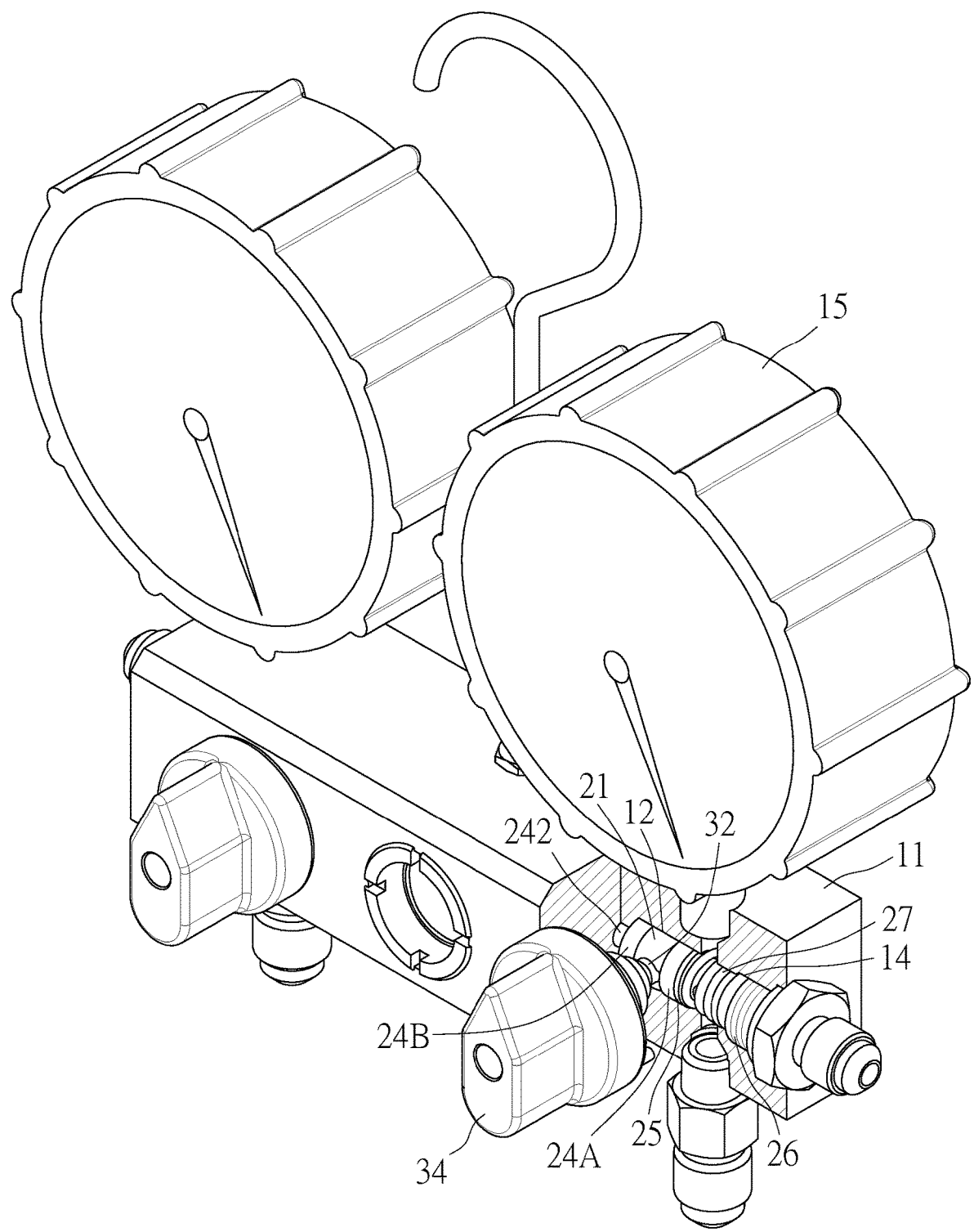
FIG. 2 is a schematic view according to the first embodiment of the present invention after being assembled.
Figure 3:
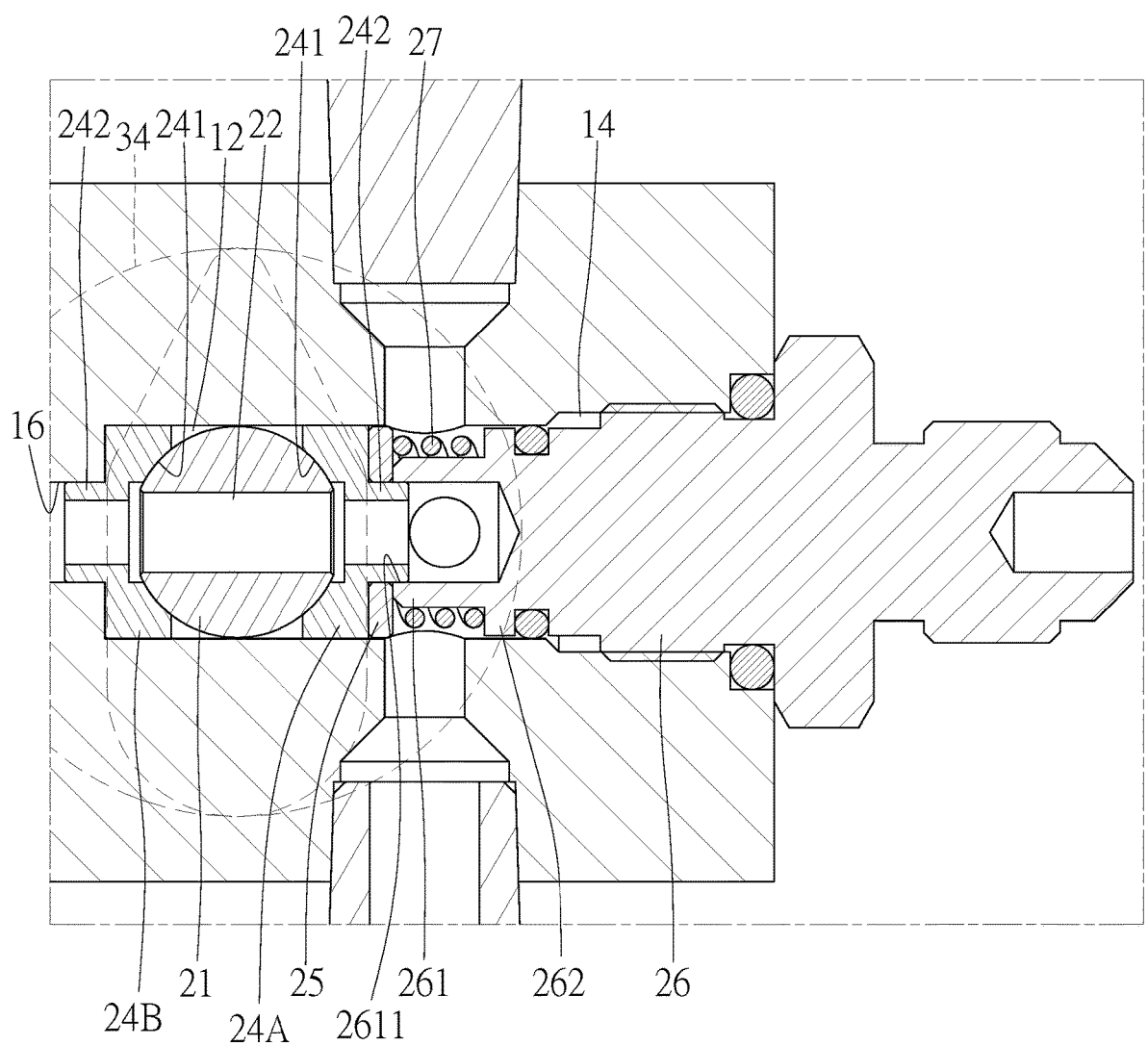
FIG. 3 is a cross-sectional view according to the first embodiment of the present invention.

Referring to FIG. 1 through FIG. 3, a ball valve structure according to a first embodiment of the present invention comprises a valve body 11, a valve ball 21, and a valve stem 31. The valve body 11 has a valve chamber 12 therein. One side of the valve body 11 is formed with a first through hole 13 communicating with the valve chamber 12. Another side of the valve body 11 is formed with a second through hole 14 communicating with the valve chamber 12. In the first embodiment, the valve body 11 has a rectangular shape and is externally connected with a meter unit 15 for the user to detect the pressure value of the refrigerant flowing into the valve body 11 through the meter unit 15. The first through hole 13 is perpendicular to the second through hole 14.

The valve ball 21 is accommodated in the valve chamber 12. The valve ball 21 defines a flow hole 22 therein. One side of the valve ball 21 is recessed to form an engaging portion 23 facing the first through hole 13. A first gasket 24A and a second gasket 24B are in close contact with two opposite side surfaces of the valve ball 21, so that the valve ball 21 can rotate around a fixed point in the valve chamber 12. Each gasket 24A, 24B is a hollow ring and has an abutting face 241 facing the valve ball 21 and corresponding to the curvature of the surface of the valve ball 21. The other end face of each gasket 24A, 24B, facing away from the abutting face 241, is provided with a communicating pipe portion 242 with a slightly smaller outer diameter. The communicating pipe portion 242 of the second gasket 24B located on one side (that is, the left side in FIG. 3) of the valve ball 21 is inserted into an inner flow passage 16 communicating with the valve chamber 12. The communicating pipe portion 242 of the first gasket 24B located on the other side (that is, the right side in FIG. 3) of the valve ball 21 faces the second through hole 14 and is sleeved with an annular washer 25. A tightening bolt 26 is screwed into the second through hole 14. One end portion 261 of the tightening bolt 26, facing the valve chamber 12, abuts against the washer 25 to push the washer 25 and the first gasket 24A, so that the abutting face 241 of the first gasket 24A is in close contact with the surface of the ball valve 21. A compression spring 27 is sleeved onto the end portion 261 of the tightening bolt 26. The compression spring 27 is helical and has more than two loops, and there is a predetermined distance between adjacent loops. One end of the compression spring 27 presses against an annular raised portion 262 on the outer edge of the end portion 261, and the other end of the compression spring 27 elastically presses against the washer 25. One end face of the end portion 261, facing the valve chamber 12, is formed with a connecting hole 2611. The communicating pipe portion 242 of the first gasket 24A is slidably inserted into the connecting hole 2611. The connecting hole 2611 and the inner flow passage 16 are located on the same axis.

The valve stem 31 has an engaging end 32 and a coupling end 33. The engaging end 32 of the valve stem 31 is inserted through the first through hole 13 of the valve body 11 and engaged with the engaging portion 23 of the valve ball 21. The coupling end 33 of the valve stem 31 extends out of the valve body 11 and is connected with a control member 34 in the form of a rotary knob. The valve ball 21 can be rotated synchronously by turning the control member 34, enabling the flow hole 22 of the valve ball 21 to be aligned with or not to be aligned with the inner flow passage 16.

The present invention uses a single compression spring 27 to push against the first gasket 24A. When there is a gap between each gasket 24A, 24B and the valve ball 21 due to wear, the elastic force of the compression spring 27 automatically acts on the washer 25, so that each gasket 24A, 24B is still in close contact with the surface of the valve ball 21 to compensate the gap and maintain its tightness, thereby effectively prolonging its service life. Furthermore, the second gasket 24B is confined to be on the outer peripheral wall 161 of the inner flow passage 16 and is in a stationary state. When the valve ball 21 is rotated and switched, excessive deflection and shaking caused by uneven forces on both sides of the valve ball 21 can be effectively avoided, so as to prevent leakage.

On the other hand, in the present invention, the compression spring 27 is helical and has more than two loops to provide sufficient thrust. The compression spring 27 may be replaced with one having a different number of loops or a different diameter according to actual needs. When the tightening bolt 26 is assembled, there is no need for frequent adjustments. With the compression spring 27, the tightness of the switch can be effectively adjusted, so that the control member 34 connected to the valve stem 31 can be rotated more smoothly. In addition, in the present invention, since each gasket 24A, 24B is integrally formed with the communicating pipe portion 242 to be inserted into the inner flow passage 16, the washer 25 and the connecting hole 2611 to provide a limit function, so that the assembly can be easier. Besides, it can also ensure that each gasket 24A, 24B will not deflect and shake when in use. There is no need to frequently adjust the tightening bolt 26, so that the assembly of the present invention is simple and fast, so as to improve the assembly efficiency.

Figure 4:
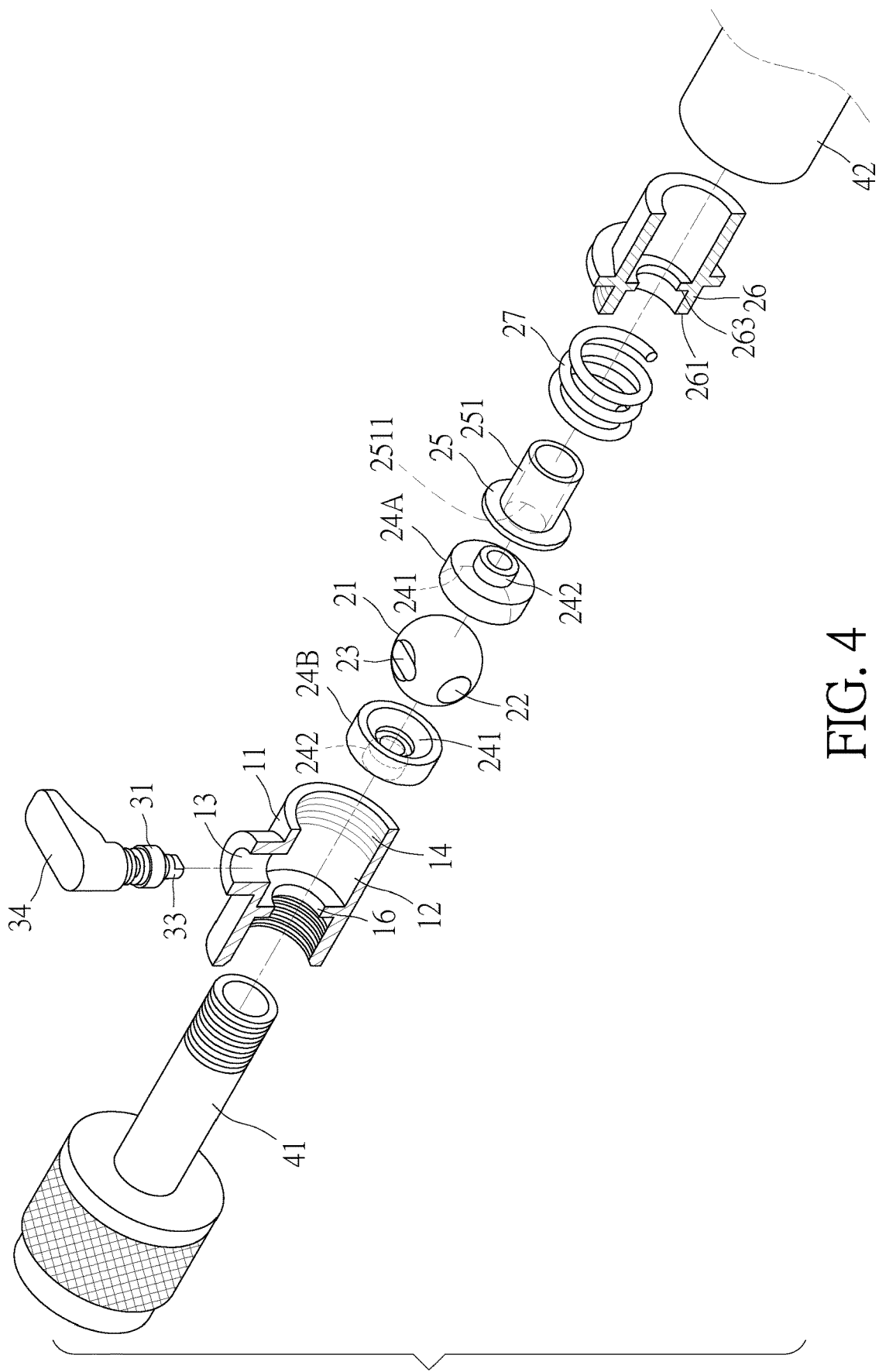
FIG. 4 is an exploded view according to a second embodiment of the present invention.
Figure 5:
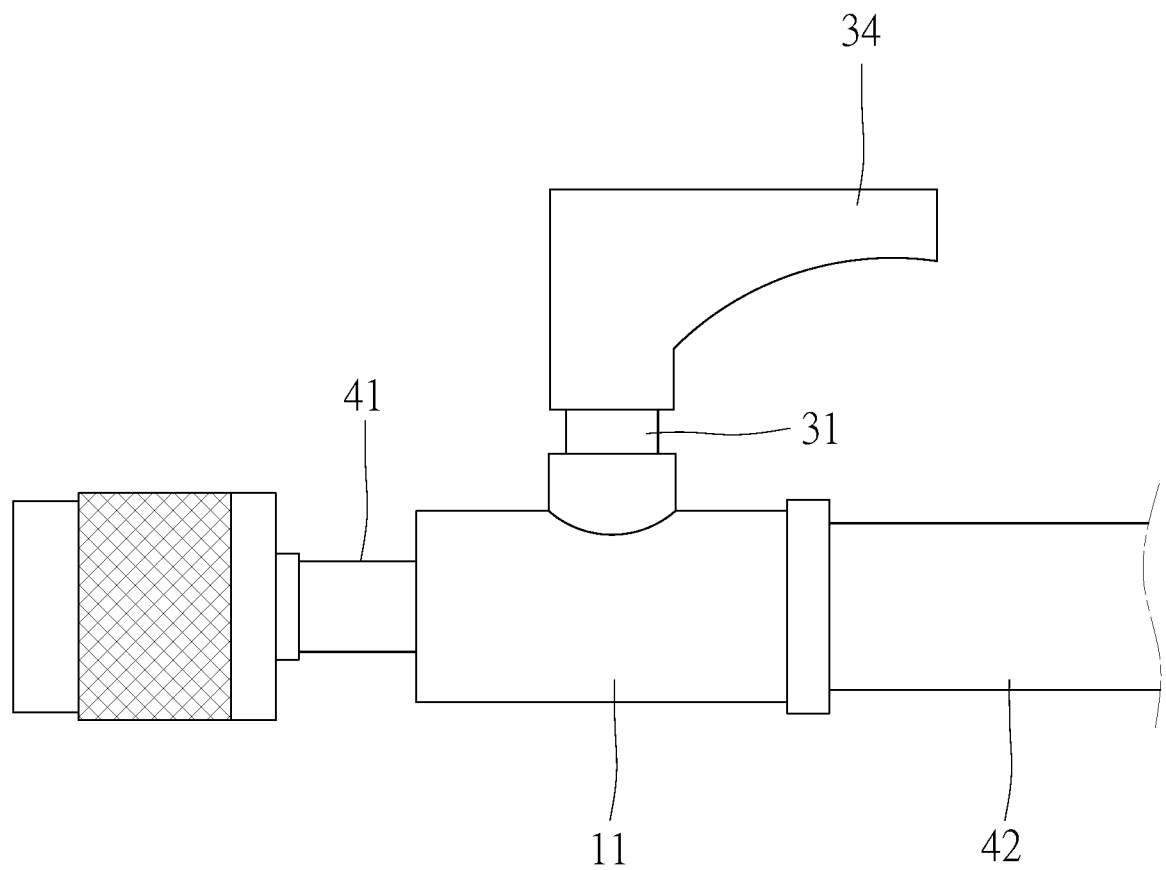
FIG. 5 is a schematic view according to the second embodiment of the present invention after being assembled.

FIG. 4 and FIG. 5 illustrate a second embodiment of the ball valve structure of the present invention. The second embodiment is substantially similar to the first embodiment with the exceptions described hereinafter. The valve body 11 is in the form of a cylindrical tube, and has the valve chamber 12 therein for accommodating the valve ball 21, the two gaskets 24A and 24B, and the washer 25. The tightening bolt 26 is in the form of a hollow tube and is locked in the second through hole 14. The end portion 261 of the tightening bolt 26, facing the valve chamber 12, abuts against the washer 25 and the corresponding gasket 24A. One end of the compression spring 27 presses against a shoulder 263 on the inner edge of the end portion 261, and the other end of the compression spring 27 elastically presses against the washer 25. One side of the washer 25, facing the end portion 261, is integrally formed with a pillar portion 251. The other end of the compression spring 27 is sleeved onto the pillar portion 251 to facilitate the assembly. The pillar portion 251 has a coupling hole 2511 with two open ends. The communicating pipe portion 242 of the first gasket 24A is inserted into the coupling hole 2511. In the second embodiment, one end of the valve body 11, having the inner flow passage 16, is connected with a connector 41, and one end of the tightening bolt 26, facing away from the valve chamber 12, is sleeved with a pipe 42 so as to form a refrigerant pipe structure. Similarly, in cooperation with the arrangement of the single compression spring 27, each gasket 24A, 24B has its communicating pipe portion 242 to provide a limit function for assembly. The second embodiment of the present invention is also able to prevent leakage, and can prolong the service life, and is simple and fast in assembly.

What is claimed is:

1. A ball valve structure, comprising:
a valve body formed with a valve chamber therein, the valve body being formed with a first through hole and a second through hole, respectively, communicating with the valve chamber;
a valve ball disposed in the valve chamber and formed with a flow hole therethrough, a first gasket and a second gasket contacting two opposite surfaces of the valve ball, the valve ball being rotatable around a fixed point in the valve chamber, each of the first gasket and the second gasket being a hollow ring and formed with an abutting face on respective sides thereof facing the valve ball and having a contour corresponding to a respective surface of the valve ball, and respective opposing sides of each of the first gasket and the second gasket facing away from the valve ball having a communicating pipe portion extending therefrom, wherein a diameter of the flow hole of the valve ball is greater than a diameter of the communicating pipe portion of each of the first and second gaskets, an annular washer sleeved onto the communicating pipe portion of the first gasket and directly abutting against the side of the first gasket facing away from the valve ball, a tightening bolt having an end formed with a threaded portion screwed into the second through hole of the valve body, the end of the tightening bolt having a shoulder portion, and the diameter of the communicating pipe portion of the first gasket is less than a diameter of the end of the tightening bolt, and a helical spring disposed in the valve chamber and having a first end directly abutting against a surface of the annular washer facing away from the first gasket and an opposing second end directly abutting the shoulder of the tightening bolt to apply a bias force through the annular washer to the first gasket, and thereby press the first gasket against a corresponding surface of the valve ball, the end of the tightening bolt including an unthreaded portion extending from the threaded portion into the valve chamber and having a diameter lesser than a diameter of the threaded portion, the end of the tightening bolt being formed with an opening into which the communicating pipe portion of the first gasket is received, and the helical spring being sleeved onto the unthreaded portion of the end of the tightening bolt and being spaced from the threaded portion of the end of the tightening bolt;
a valve stem connected to the valve ball through the valve body for driving the valve ball to rotate, whereby fluid flow through the flow hole is selectively opened and closed.

2. The ball valve structure as claimed in claim 1, wherein a side section of the valve ball facing the first through hole is recessed to form an engaging portion, the valve stem being formed with an engaging end and a coupling end on opposing end portions thereof, the engaging end of the valve stem is inserted through the first through hole of the valve body to be engaged with the engaging portion of the valve ball, and the coupling end of the valve stem extends out of the valve body to be connected with a control member.

3. The ball valve structure as claimed in claim 1, wherein the communicating pipe portion of the second gasket is inserted into an inner flow passage communicating with the valve chamber.

4. The ball valve structure as claimed in claim 1, wherein the shoulder portion of the tightening bolt is an annular raised portion formed between the threaded and unthreaded portions on an outer surface of the end of the tightening bolt, and the second end of the helical spring directly abutting against the annular raised portion, and the diameter of the communicating pipe portion of the first gasket is less than a diameter of the opening in the end of the tightening bolt.

5. A ball valve structure, comprising:
- a valve body formed with a valve chamber therein, the valve body being formed with a first through hole and a second through hole, respectively, communicating with the valve chamber;
- a valve ball disposed in the valve chamber and formed with a flow hole therethrough, a first gasket and a second gasket contacting two opposite surfaces of the valve ball, the valve ball being rotatable around a fixed point in the valve chamber, each of the first gasket and the second gasket being a hollow ring and formed with an abutting face on respective sides thereof facing the valve ball and having a contour corresponding to a respective surface of the valve ball, and respective opposing sides of each of the first gasket and the second gasket facing away from the valve ball having a communicating pipe portion extending therefrom, wherein a diameter of the flow hole of the valve ball is greater than a diameter of the communicating pipe portion of each of the first and second gaskets, an annular washer sleeved onto the communicating pipe portion of the first gasket and directly abutting against the side of the first gasket facing away from the valve ball, a tightening bolt having an end formed with a threaded portion screwed into the second through hole of the valve body, the end of the tightening bolt having a shoulder portion, and the diameter of the communicating pipe portion of the first gasket is less than a diameter of the end of the tightening bolt, and a helical spring disposed in the valve chamber and having a first end directly abutting against a surface of the annular washer facing away from the first gasket and an opposing second end directly abutting the shoulder of the tightening bolt to apply a bias force through the annular washer to the first gasket, and thereby press the first gasket against a corresponding surface of the valve ball, the tightening bolt being a hollow tube, and the shoulder portion of the tightening bolt being formed on an inner edge of the end of the tightening bolt, the surface of the annular washer facing away from the first gasket being formed with a pillar portion onto which the helical spring is sleeved, the pillar portion having a coupling hole, and the communicating pipe portion of the first gasket being inserted into the coupling hole;
- a valve stem connected to the valve ball through the valve body for driving the valve ball to rotate, whereby fluid flow through the flow hole is selectively opened and closed.

\* \* \* \* \*